March 19, 1940.  P. M. CARTER ET AL  2,193,898
STEERING MECHANISM
Original Filed Dec. 9, 1935   2 Sheets-Sheet 1
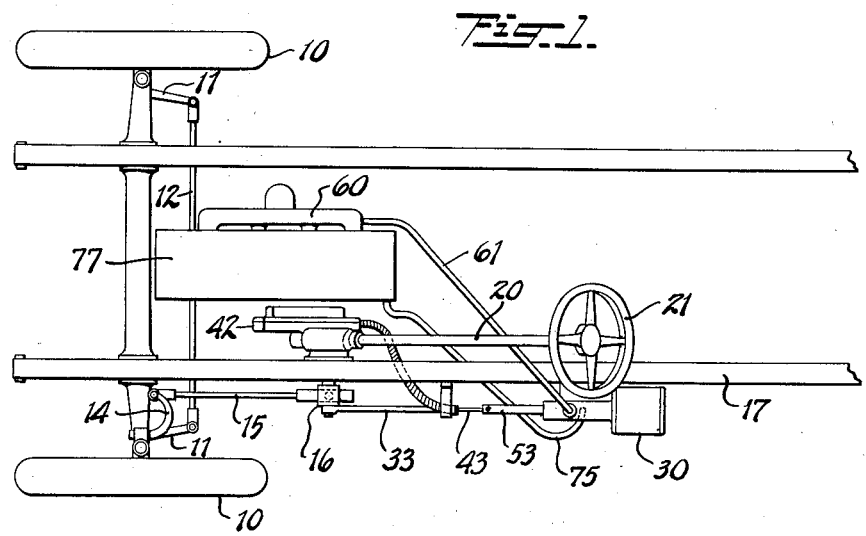
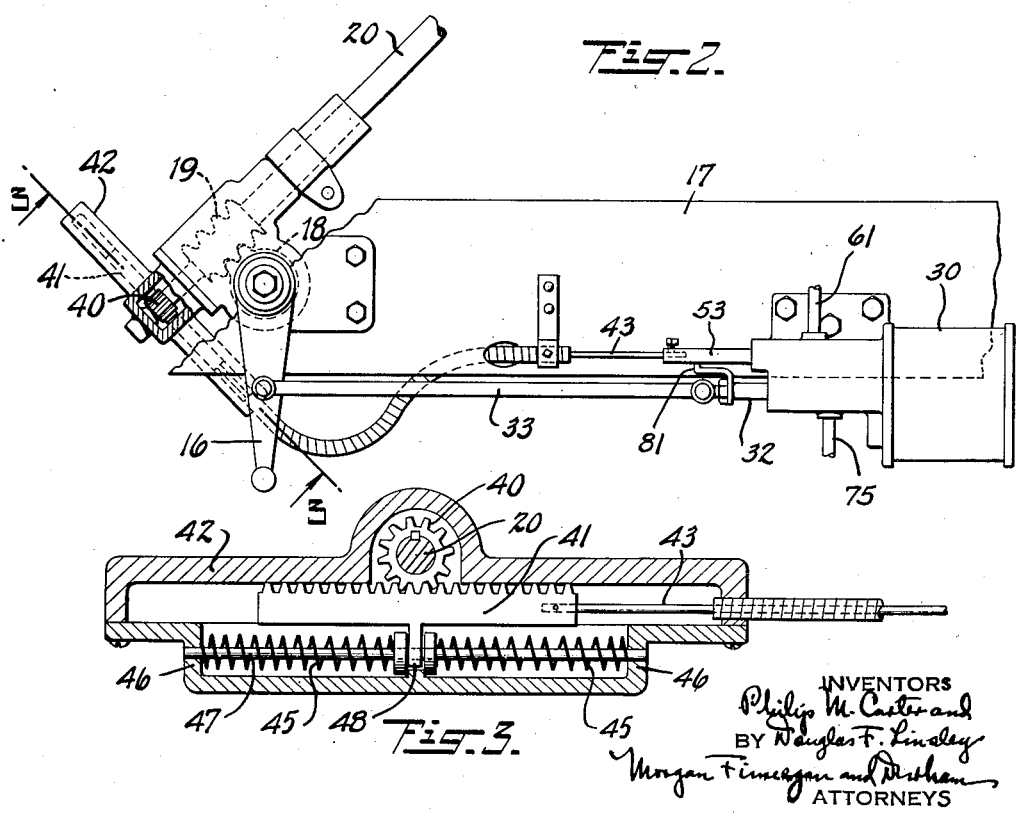

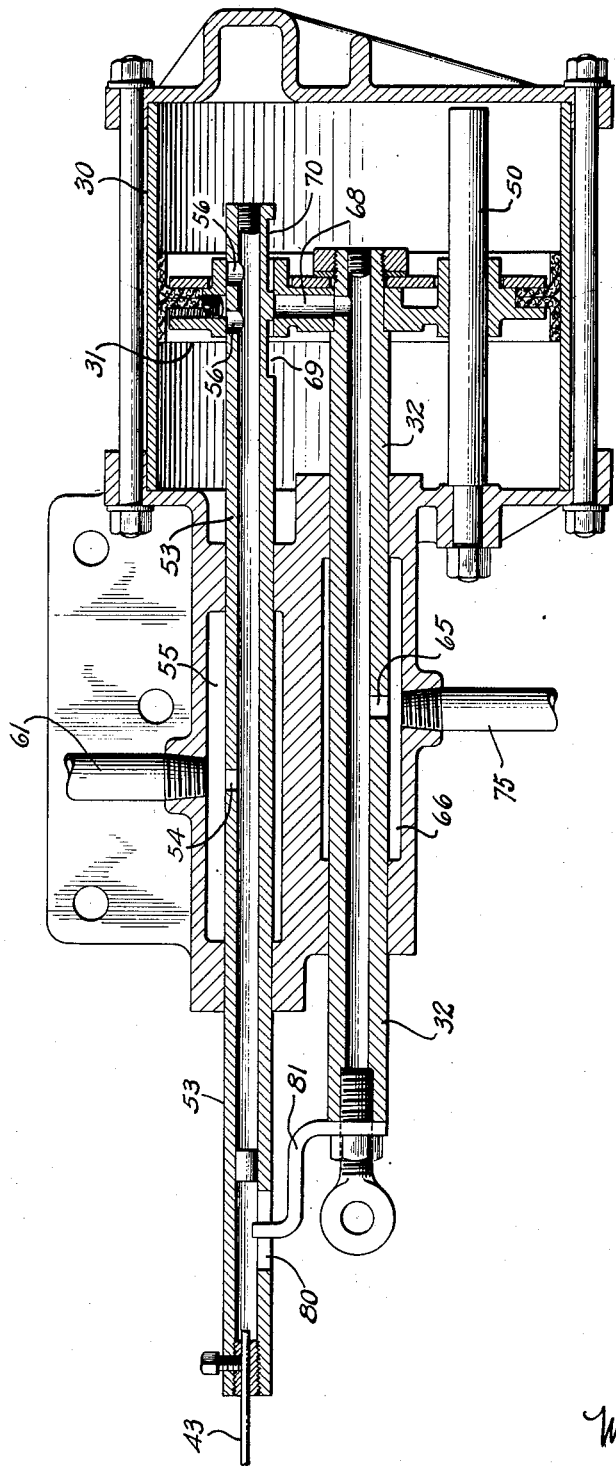

Patented Mar. 19, 1940

2,193,898

UNITED STATES PATENT OFFICE 2,193,898

STEERING MECHANISM

Philip M. Carter, New York, and Douglas F. Linsley, Buffalo, N. Y., assignors to Vaco Products, Inc., a corporation of Delaware Application December 9, 1935, Serial No. 53,448
Renewed August 3, 1939

1 Claim. (Cl. 180—79.2)

The present invention relates to steering mechanism and more particularly to a novel and improved fluid pressure operated steering mechanism particularly adapted for use with automotive vehicles.

The present invention has for its object the provision of an improved power-operated steering mechanism particularly adapted for use with automobiles. Another object of the invention is the provision of a power-operated steering mechanism which may be actuated by suction derived from the intake manifold of the internal combustion engine. Still another object of the present invention is the provision of an improved steering mechanism which is easier to operate and is safer in operation. The invention also provides a power-operated steering mechanism for automotive vehicles in which manual steering means are alternatively and automatically rendered operative upon failure of the power steering means.

In accordance with the present embodiment of the invention, there is provided a manual steering mechanism which is in many respects similar to conventional steering mechanism and is provided with a steering wheel geared to a pitman arm which in turn is connected through links to the steering knuckles, on which the vehicle wheels are rotatable. A fluid pressure, and preferably suction, operated piston is connected to the pitman arm to move the pitman arm in either direction and this piston is movable within its cylinder under control of a valve so that the piston movement in either direction is exactly proportional to the movement of the control valve. The control valve is connected to the gear driving the pitman arm and is also connected with spring means tending slightly to return the valve to a normal position corresponding to "straight ahead". As is always the case, there is a slight amount of backlash in the gearing between the steering wheel and the pitman arm and, during power operation of the steering means, the valve is moved to cause a corresponding movement of the piston and the consequent steering operation before this backlash is taken up, but in case of a power failure the power mechanism is automatically rendered idle and the operator can steer the vehicle by taking up the backlash and thereafter moving the pitman arm in the conventional manner.

Among the many advantages arising from the use of the present invention may be mentioned the following:

Steering of the vehicle is facilitated and imposes no strain on the operator even when the vehicle is moving very slowly, as when parking. The gear ratio between the steering wheel and the steering knuckles may be reduced, thereby reducing the amount of turning of the steering wheel necessary for a sharp turn, and at the same time increasing the maneuverability of the vehicle in traffic. The fluid pressure operating cylinder acts to stabilize the steering mechanism at high speeds or on rough roads, so that the effort of such driving is reduced and safety is increased, and for the same reason the effect of a blow-out of a tire is minimized. Tire wear may be reduced and the importance of the camber, toe-in and caster angles is reduced. Failure of any part of the power-operated mechanism cannot have serious effects as the manual steering mechanism is always available and is automatically rendered operative. The steering mechanism is self-centering and no effort on the part of the driver is necessary to keep the vehicle traveling in a straight path, and if the steering wheel is released the wheels are automatically moved to straight ahead position.

It will be understood that the foregoing general description, and the following detailed description as well, are exemplary and explanatory of the invention but are not restrictive thereof.

The accompanying drawings, referred to herein and constituting a part hereof, illustrate one embodiment of the invention, and together with the description, serve to explain the principles of the invention.

Of the drawings:

Figure 1 is a fragmentary diagrammatic plan view of an illustrative embodiment of the invention as applied to an automobile;

Figure 2 is a fragmentary side view of the mechanism shown in Figure 1 on a somewhat larger scale;

Figure 3 is a sectional view on the line 3—3 of Fig. 2; and

Figure 4 is a longitudinal section through the fluid pressure operated power cylinder.

Referring now in detail to the illustrative embodiment of the invention as shown in the accompanying drawings, the invention is shown as applied to a worm and segment type of automotive steering gear and is shown as adapted for operation by suction derived from the intake manifold of the usual type of internal combustion engine now used in automobiles.

The automobile is provided with the usual front wheels 10 which are mounted on their individual steering knuckles 11 so that they may be swung about their king pins, while remaining substantially parallel or tangent to concentric circles and thus serve to steer the vehicle. The steering knuckles are interconnected by means of a tie-rod 12 to which the steering knuckles are pivotally connected. One of the steering knuckles is fixed to a bell crank 14 connected by pitman 15 to pitman arm 16. Pitman arm 16 is oscillatably journalled in the side frame 17 and is fixed to a segment 18 meshing with a worm gear 19 rotatably mounted and turned by means of shaft 20 to the other end of which is connected the steering wheel 21 for operation by the driver.

For manual operation of the steering gear, the operator turns the steering wheel 21, and thus swings the wheels 10 to one side or the other, the swinging movement of each wheel being approximately the same as that of the other.

Fluid pressure means are provided for moving the vehicle wheels under the control of the steering wheel, and for this purpose a fluid pressure cylinder 30 is rigidly mounted on the side frame 17. Within this cylinder is a piston 31 movable therein having a piston rod 32 projecting through one end wall of the cylinder and connected by link 33 to an intermediate portion of the pitman arm 16. The diameter and stroke of the piston 32 are such that, considering the difference in pressure to be applied to the two sides of the piston, the operator will be relieved of all or a large part of the effort of steering, and the ratio of manual effort for steering to the power applied for steering can be established and maintained as desired.

Valve means are provided, as will be explained below, for definitely positioning the piston at any desired point and for stopping movement of the piston when it has reached the predetermined location. These valve means are preferably positively connected to the steering wheel or to the steering wheel shaft 20 so that the valve is moved proportionally to the movement by the operator of the steering wheel 21, thus causing a similar and exactly proportional movement of the fluid pressure operated piston 31.

In every steering mechanism there is necessarily a small amount of backlash which cannot be eliminated, and we have found it preferable to connect the valve means between the point of backlash and the steering wheel, and to connect the fluid pressure means between the backlash and the vehicle wheels. In this way, the operator in steering the vehicle need only take up a small amount of the backlash in order to bring the power means into operation, and by continuing the turning of the steering wheel, the power means remain in operation until the vehicle wheels have been moved as far as possible. By this arrangement, the manual steering means is always automaticaly rendered operative in case of a possible failure of power, and comes into operation at any time that the power means does not keep the steering ahead of such turning as would be necessary to remove all of the backlash.

The control valve means are preferably connected to the steering wheel shaft 20 and as embodied, a pinion 40 is mounted at the lower end of the shaft 20 and is fixed thereto. Pinion 40 meshes with a rack 41 which is guided by means of housing 42 and is connected to one end of a push-pull wire control 43, which has its other end directly connected to the fluid pressure control valve so that the valve is moved proportionally to the turning of the steering wheel 21 and causes a movement of the pitman arm just sufficient to keep it ahead of worm gear 19.

For returning the vehicle wheels 10 and steering wheel 21 to straight ahead position automatically, resilient means are connected to the rack 41 tending to move it to its normal straight ahead position any time when the wheel 21 is released by the operator. These resilient means comprise a pair of springs 45 compressed between the ends 46 of housing 42, and coiled about a guide rod 47, and having mounted between them a lug 48 fixed to the rack 41. As the operator removes his hands from the wheel 21 with the wheel turned from straight ahead position, one or the other of springs 45, depending on which one is compressed, moves the rack 41 towards straight ahead position, and can do so due to the backlash betwen worm gear 19 and segment 18. This action moves the control valve, causing a power movement of the piston 31 and this action continues until the rack 41 has been moved back to the position where springs 45 are equally compressed, which corresponds to straight ahead position of vehicle wheels 10.

Cylinder 30 is closed at both ends and piston 31 is held against turning within the cylinder by means of guide rod 50 supported by one end wall of cylinder 30 and passing through a corresponding, substantially air-tight aperture in the piston. Piston 31 is also provided with another aperture through which passes a valve rod 53 to apply suction to one side or the other of the piston 31. Valve rod 53 is hollow throughout most of its length and is provided with a port 54 opening into the suction chest 55 at one end of the cylinder, while at its end where it passes through the piston 31, the valve rod is provided with one or more ports 56 which are spaced together closely enough so that they may be closed by the web of the piston 31, thereby permitting suction to be applied to either or neither side of the piston 31, but not to both sides of the piston. Suction chest 55 is connected to the source of suction such as the intake manifold 60 by means of pipe 61, and the chest is sufficiently long to apply suction to the valve port 54 at any position of the valve rod.

Venting means are provided for venting one side of the piston 31 at a time, and thus as suction is applied to one side of the piston, movement of the piston is facilitated and rendered accurately controllable by the venting of the other side of the piston. As embodied, piston rod 32 is also hollow for most of its length and is provided with a port 65 to communicate with the venting chest 66 in any position of the piston. The hollow interior of the piston rod is also in communication with a venting duct 68 formed in the web of piston 31 and communicating with the valve rod aperture in the piston. Adjacent this venting duct, valve rod 53 is provided with two venting ports 69 and 70 either of which may be connected with its respective side of the piston and with the venting duct 68, and so positioned with respect to the suction ports 56 that when suction is applied to one side of the piston, the other side is vented.

As the valve rod 53 is moved relatively to the piston 31, suction is applied to that side of the piston towards which the valve is moved, and the piston is immediately moved until it has closed the suction port 56, at which point the piston remains until it is again moved either in the same direction or in the other direction, and the movement of the piston is always substantially proportional to and in the present embodiment is exactly equal to, the movement of the piston valve rod, and likewise to the steering wheel.

For lubricating the piston, valve and other parts of the suction means, the venting chest 66 is connected by means of pipe 75 with the upper portion of the crankcase or valve chamber of the internal combustion engine 77, so that as the cylinder 30 is vented, the air is taken from the inside of the engine, and this air includes a small amount of finely divided oil which is sucked into the cylinder 30.

For safety in operation, means are provided permitting only a limited amount of relative movement between the piston 31 and valve rod 53, so that if either is moved, the other will be picked up and moved with it after a predetermined amount of relative movement. As embodied, the external end of valve rod 53 is slotted, as at 80, and receives the end of an offset lug 81 attached to the piston rod 32. Due to this interconnection, if connection 61 be broken, the piston 31 is moved idly, and is vented on both its sides so that its movement is not appreciably impeded. Thus in moving in either direction, one side of the cylinder will be vented through the crankcase line 75, while the other side will be vented through the intake manifold.

Once the piston 31 and valve rod 53 have been brought into stationary position, attempted movement of the piston 31, as by road shocks, moves the piston 31 slightly until the valve port 56 on the other side of the piston has been opened tending to return the piston.

The invention in its broader aspects is not limited to the specific mechanisms shown and described but departures may be made therefrom within the scope of the accompanying claims without departing from the principles of the invention and without sacrificing its chief advantages.

What we claim is:

In an automotive vehicle the combination of wheels by which the vehicle is steered, a source of suction, and means for moving the wheels for steering manually or by suction including a steering wheel, a worm driven by the steering wheel, a meshing segment driven by the worm and connected to move the wheels, a suction operated piston, a valve movable independently of and projecting through the piston and having ports to apply suction to either side of the piston, a cylinder in which the piston is movable, means for venting either side of the piston and resilient means tending to move said valve to a predetermined position, said piston being connected to the segment while the valve is connected to the worm.

PHILIP M. CARTER.
DOUGLAS F. LINSLEY.